United States Patent
Sato et al.

(10) Patent No.: US 11,110,926 B2
(45) Date of Patent: Sep. 7, 2021

(54) BRAKING FORCE CONTROLLER

(71) Applicant: TOYOTA JIDOSHA KABUSHIKI KAISHA, Toyota (JP)

(72) Inventors: Shun Sato, Toyota (JP); Hiromasa Takai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/816,411

(22) Filed: Mar. 12, 2020

(65) Prior Publication Data
US 2020/0324774 A1 Oct. 15, 2020

(30) Foreign Application Priority Data
Apr. 15, 2019 (JP) .............................. JP2019-077358

(51) Int. Cl.
*B60W 30/18* (2012.01)
*B60W 10/02* (2006.01)
*B60W 10/11* (2012.01)
*B60W 10/18* (2012.01)

(52) U.S. Cl.
CPC .... *B60W 30/18072* (2013.01); *B60W 10/026* (2013.01); *B60W 10/11* (2013.01); *B60W 10/18* (2013.01); *B60W 2540/10* (2013.01); *B60W 2540/12* (2013.01); *B60W 2710/024* (2013.01);
(Continued)

(58) Field of Classification Search
CPC .... B60W 10/026; B60W 10/11; B60W 10/18; B60W 10/184; B60W 10/196; B60W 30/18; B60W 30/18072; B60W 30/18109; B60W 2030/18081; B60W 2030/1809; B60W 2540/10; B60W 2540/12;
(Continued)

(56) References Cited

U.S. PATENT DOCUMENTS

| 2007/0072737 | A1* | 3/2007 | Dickinson | B60W 10/11 477/176 |
| 2012/0109480 | A1* | 5/2012 | Morimura | B60W 10/30 701/70 |

(Continued)

FOREIGN PATENT DOCUMENTS

| JP | H10-280990 A | 10/1998 |
| JP | 2006-297994 A | 11/2006 |
| WO | 2006/109139 A1 | 10/2006 |

*Primary Examiner* — Edwin A Young
(74) *Attorney, Agent, or Firm* — Oliff PLC

(57) ABSTRACT

A braking force controller includes: a target jerk calculation unit; a first estimation unit configured to estimate an increment of braking force when a prescribed factor that increases braking force to be generated by the first actuator unit currently occurs; a second estimation unit configured to estimate the increment of the braking force when the prescribed factor occurs within a prescribed period; and a control unit configured to determine a negative jerk generated when the second actuator unit generates the braking force such that a sum of the negative jerk and the jerk generated by the first actuator unit without the prescribed factor becomes the target jerk. When the increment of the braking force due to the prescribed factor is larger than a prescribed value, the control unit corrects the determined negative jerk such that an absolute value of the negative jerk becomes smaller.

5 Claims, 7 Drawing Sheets

(52) U.S. Cl.
CPC . *B60W 2710/1005* (2013.01); *B60W 2710/18* (2013.01)

(58) Field of Classification Search
CPC ... B60W 2710/024; B60W 2710/1005; B60W 2710/18; B60T 2230/04
See application file for complete search history.

(56) References Cited

U.S. PATENT DOCUMENTS

2015/0266481 A1* 9/2015 Nedorezov ............. F16H 57/04
192/3.33
2018/0202545 A1* 7/2018 Zhao ................... B60W 10/026

\* cited by examiner

BRAKING FORCE CONTROLLER

INCORPORATION BY REFERENCE

The disclosure of Japanese Patent Application No. 2019-077358 filed on Apr. 15, 2019 including the specification, drawings and abstract is incorporated herein by reference in its entirety.

BACKGROUND

1. Technical Field

The present disclosure relates to a braking force controller mounted on a vehicle to control braking force of the vehicle.

2. Description of Related Art

In the field of vehicles, various kinds of techniques are proposed for improving ride comfort and operation feeling. For example, Japanese Patent Application Publication No. 10-280990 discloses a fuel cut controller. When fuel cut is prohibited during braking of a vehicle to prevent catalyst from deteriorating under high temperature condition, the fuel cut controller compensates braking force by using an alternator, an air-conditioner, a brake, a gearshift, or the like, to acquire a desired braking force. Japanese Patent Application Publication No. 2006-297994 discloses an integrated vehicle control apparatus. The integrated vehicle control apparatus distributes control targets, determined based on the amount of operation by a user, to a drive system and a control system in accordance with a charge ratio. The integrated vehicle control apparatus also transmits the control targets before distribution to a stabilization system to cause the stabilization system to perform a correction process, for the purpose of eliminating the necessity of the stabilization system to synchronize values of the distributed control targets so as to reduce delay and improve responsiveness with respect to operation.

SUMMARY

For adequate ride comfort and operation feeling in a vehicle, it is desirable to provide a user with adequate deceleration feeling, when, for example, the user stops operating an accelerator pedal, and thereby the vehicle shifts to a coasting state where neither the accelerator pedal nor a brake pedal is operated.

Factors of the adequate deceleration feeling include decreasing negative acceleration when the travel direction of the vehicle is defined as a positive direction (increasing an absolute value of acceleration in a deceleration direction of the vehicle), as well as decreasing negative jerk when the travel direction of the vehicle is defined as a positive direction (quickly increasing the absolute value of acceleration in the deceleration direction of the vehicle). Accordingly, the adequate deceleration feeling may be achieved by decreasing the negative jerk. Jerk j is defined as a third-order differentiation of ($j=d^3x/dt^3$) position x by time t. The jerk J is expressed in the unit of, for example, [meter per second per second per second ($m/s^3$)]. As is clear from the definition, the jerk is the rate of change of acceleration.

In the coasting state, negative jerk is caused by decrease in drive force (increase in braking force) generated in an engine or a transmission. However, by making the brake or the like generate the braking force, the negative jerk can further be decreased, and the deceleration feeling can be enhanced as described before.

However, when gear shifting by the transmission or the like increases the braking force, while the brake generates negative jerk, the negative acceleration and negative jerk generated in the vehicle degrease beyond an adequate range, which may rather deteriorate the ride comfort and operation feeling.

The present disclosure has been made in view of the above-stated problem, and it is an object of the present disclosure to provide a braking force controller capable of achieving adequate ride comfort and operation feeling while the vehicle is in a coasting state.

In order to solve the problem, one aspect of the present disclosure relates to a braking force controller mounted on a vehicle including a first actuator unit and a second actuator unit configured to generate braking force. The braking force controller is configured to control the braking force to be generated by the second actuator unit, when an operation amount of an accelerator pedal shifts to zero from other than zero, and the vehicle is put in a coasting state because of the operation amount of the brake pedal being zero. The braking force controller includes a target jerk calculation unit, a first estimation unit, a second estimation unit, and a control unit. The target jerk calculation unit is configured to calculate a target jerk that is a generation target value of jerk when the braking force is generated in the vehicle, the jerk being negative when a vehicle travel direction is defined as a positive direction. The first estimation unit is configured to determine whether or not a prescribed factor that increases the braking force generated by the first actuator unit currently occurs, and to estimate, when determining that the prescribed factor occurs, an increment of the braking force due to the prescribed factor. The second estimation unit is configured to determine whether or not the prescribed factor occurs within a prescribed period from present time even when the prescribed factor does not currently occur in the vehicle, and to estimate, when determining that the prescribed factor occurs, an increment of the braking force due to the prescribed factor. The control unit is configured to determine, based on a calculation result of the target jerk calculation unit, that a sum of the negative jerk generated when the second actuator unit generates the braking force and the jerk generated by the first actuator unit when the prescribed factor does not increase the braking force becomes the target jerk. When the prescribed factor currently occurs or occurs within the prescribed period, and the increment in the braking force due to the prescribed factor is larger than a prescribed value, the control unit corrects the determined negative jerk such that an absolute value of the negative jerk becomes smaller, based on an estimation result of the first estimation unit or the second estimation unit.

The present disclosure can provide the braking force controller capable of achieving adequate ride comfort and operation feeling in a vehicle in a coasting state.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The braking force controller according to the present disclosure controls jerk generated in a brake or the like to achieve deceleration feeling assumed to be expected by a user in a coasting state of a vehicle, and thereby achieves adequate ride comfort and operation feeling of the vehicle. In the disclosure, when braking force increases due to gear shifting of a transmission, or the like, in the coasting state, the jerk generated in the brake or the like is reduced in order to reduce fluctuation in deceleration feeling and to restrain the ride comfort and the operation feeling from deteriorating.

Embodiment

Hereinafter, an embodiment of the present disclosure will be described in detail with reference to the drawings. Parameters such as speed, acceleration, drive force, and jerk, are expressed by signed values that are positive in the direction where a vehicle travels. When negative drive force is referred to as braking force, the braking force is expressed by an absolute value.

Configuration

Figure 1:
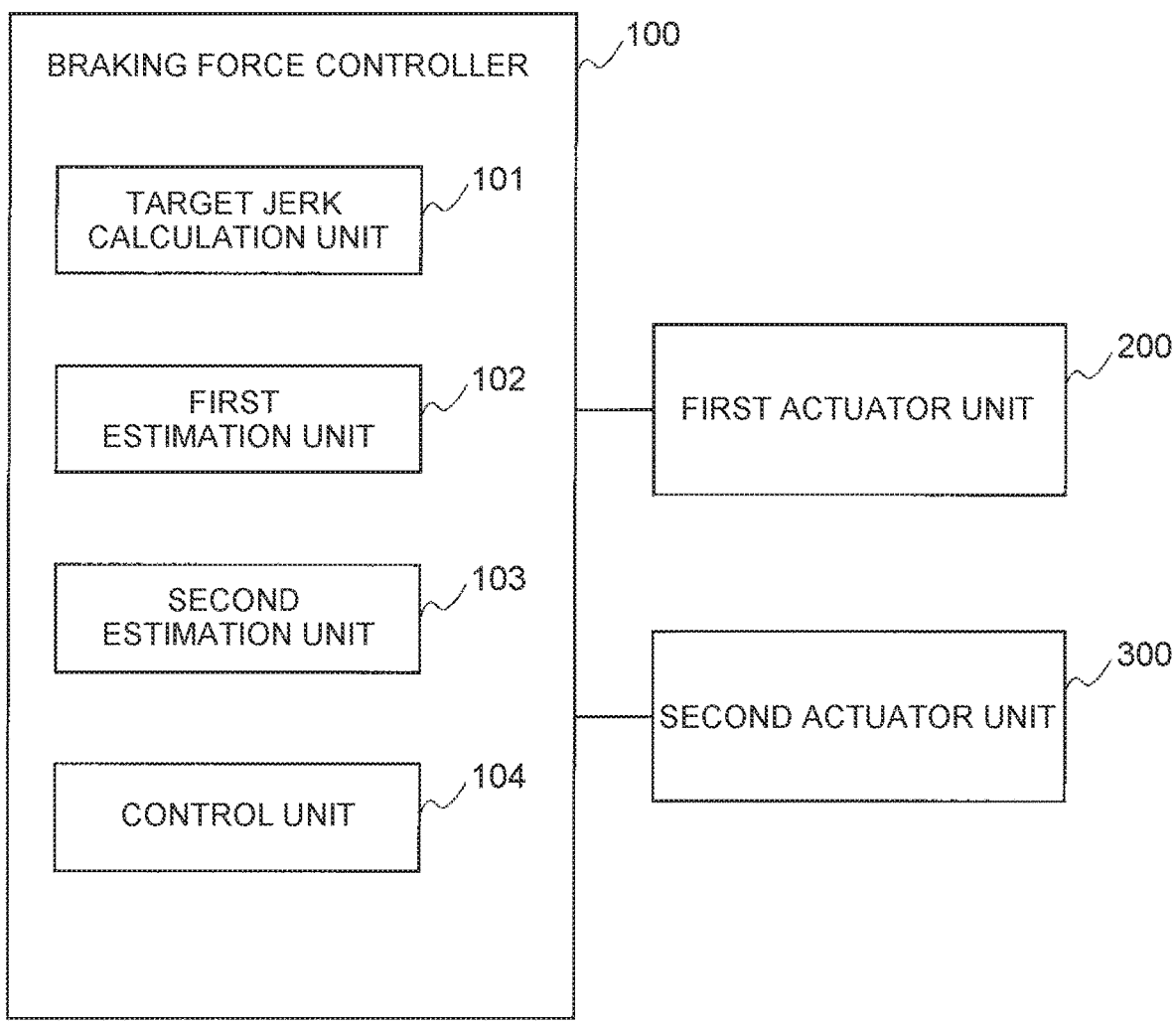
FIG. 1 is a block diagram showing a braking force controller according to an embodiment of the present disclosure.

FIG. 1 shows the configuration of a braking force controller 100 and peripheral devices according to an embodiment of the present disclosure. The braking force controller 100 is mounted on a vehicle. A first actuator unit 200 includes, for example, an engine and a transmission. A second actuator unit 300 includes, for example, a brake. While the first actuator unit 200 can generate braking force relatively stably in a coasting state, the braking force may increase independently of the control of the braking force controller 100, due to a prescribed factor caused by control from other control systems of the vehicle, such as gear shifting in the transmission. The second actuator unit 300 includes one or more prescribed actuators for generating the braking force. For providing adequate deceleration feeling for a user in the coasting state, the braking force controller 100 can control the second actuator unit 300 to generate braking force for compensating the braking force generated by the first actuator unit 200. The first actuator unit 200 and the second actuator unit 300 may each include any type and any number of actuators as long as the actuators have the characteristics as described above.

The first actuator unit 200 and the second actuator unit 300 each include a control unit configured to perform various processes regarding the actuators included in each of the actuator units. A sum total of the drive force generated by the respective actuators included in the first actuator unit 200 and the second actuator unit 300 serves as total drive force for driving the vehicle. Acceleration and jerk of the vehicle each fluctuate in accordance with the sum of the braking force generated by the respective actuators and a sum of change rates of the braking force. When the respective actuators generate braking force, the actuators contribute to the acceleration and the jerk of the vehicle. This contribution is expressed as the actuators generating the acceleration and the jerk of the vehicle. When the vehicle travels along an uphill road or a downhill road, a signed constituent of gravity along the travel direction is further added to the total drive force.

The braking force controller 100 includes a target jerk calculation unit 101, a first estimation unit 102, a second estimation unit 103, and a control unit 104.

In order to generate braking force in the coasting state, the target jerk calculation unit 101 calculates target jerk as a jerk generation target value that is negative when the travel direction of the vehicle is defined as a positive direction.

The first estimation unit 102 determines whether or not a prescribed factor, which increases the braking force generated by the first actuator unit 200, currently occurs. When determining that the prescribed factor occurs, the first estimation unit 102 estimates an increment of the braking force.

The second estimation unit 103 determines whether or not the prescribed factor, which increases the braking force generated by the first actuator unit 200, occurs within a prescribed period from present time, i.e., in the near future, although the prescribed factor does not currently occur. When determining that the prescribed factor occurs in the near future, the second estimation unit 103 estimates an increment of the braking force.

The control unit 104 determines negative jerk to be generated by the second actuator unit 300, based on a calculation result of the target jerk calculation unit 101. In the case where the prescribed factor currently occurs, and the case where the prescribed factor may occur within a prescribed period from present time although it does not currently occur, and the increment of the braking force is larger than a prescribed value, the control unit 104 corrects the determined negative jerk such that an absolute value of the negative jerk becomes smaller, based on an estimation result of the first estimation unit 102 or the second estimation unit 103. The control unit 104 instructs the second actuator unit 300 to generate the thus-calculated negative jerk. The control unit 104 also executes and controls other various kinds of processes of the braking force controller 100.

Process

Figure 2:
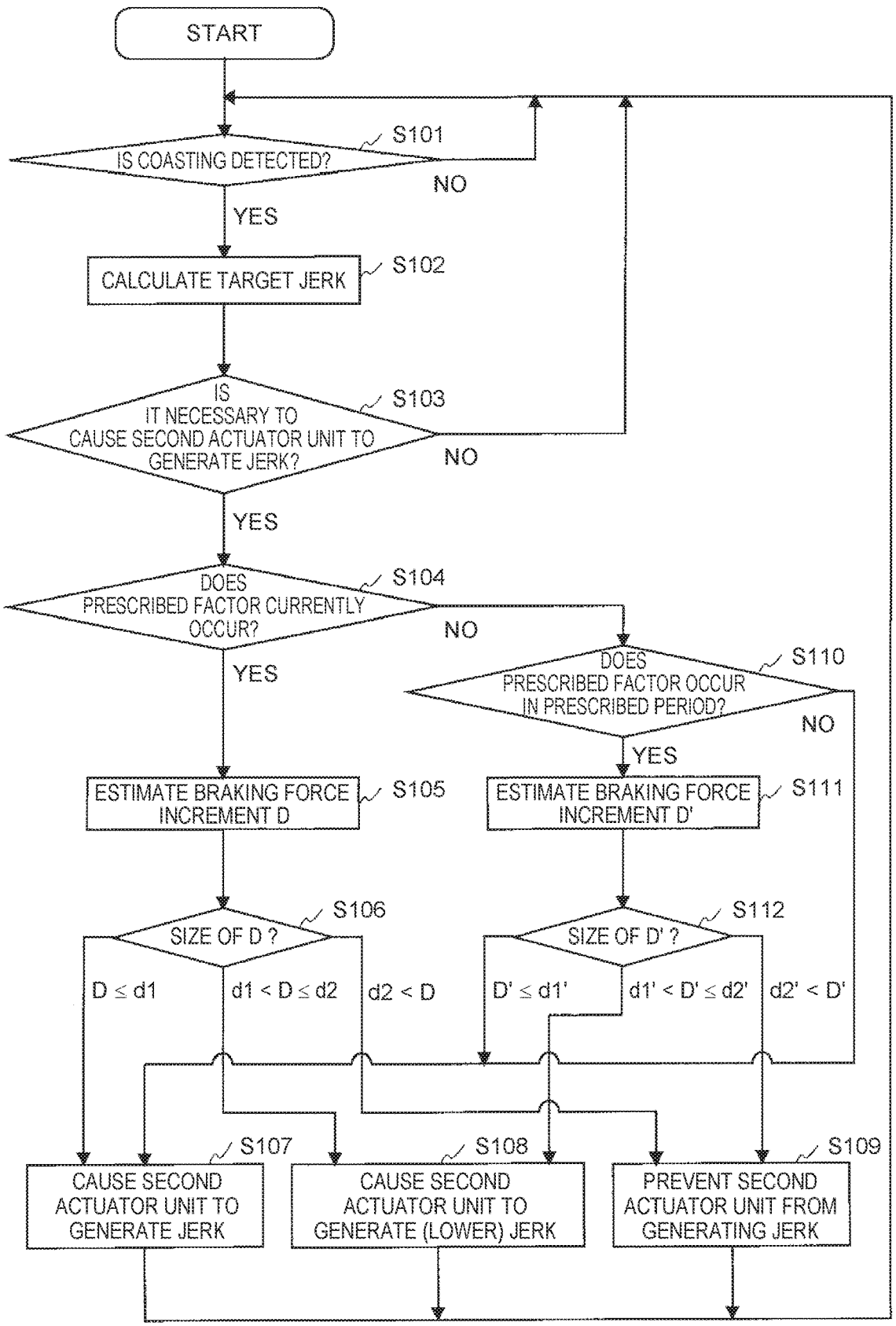
FIG. 2 shows a process according to the embodiment of the present disclosure.

FIG. 2 is a flowchart illustrating an example of a process executed by the braking force controller 100. With reference to FIG. 2, an example of acceleration control by the braking force controller 100 will be described. The process is executed in the state where the vehicle is turned on to enable travel by user operation.

(Step S101): the control unit 104 constantly acquires the amount of accelerator pedal operation by a user detected by an accelerator pedal sensor included in the vehicle and the amount of brake pedal operation by the user detected by the brake pedal sensor. Based on the acquired operation amounts of the accelerator pedal and the brake pedal, the control unit 104 detects a shift from the state where the user operates the accelerator pedal (the operation amount is not equal to zero) to the state where the user does not operate the accelerator pedal (the operation amount is equal to zero) and the user does not operate the brake pedal (the operation amount is equal to zero). As a result, the control unit 104 detects that the vehicle is in a coasting state. When the control unit 104 detects the coasting state, the process proceeds to step S102. When the control unit 104 does not detect the coasting state, the control unit 104 repeats step S101 and waits for the vehicle to be in the coasting state. In the present step, the control unit 104 typically detects the coasting state that is established when the accelerator pedal operation is released as described above. However, the control unit 104 may also detect the coasting state established when the brake pedal operation is released.

(Step S102): the target jerk calculation unit 101 calculates target jerk that is a target value of the negative jerk to be generated in the vehicle in the coasting state. The target jerk is assumed to be able to present adequate deceleration feeling to the user when the coasting state is established. The target jerk is calculated by a predetermined method. The target jerk calculation unit 101 may calculate the target jerk by acquiring from sensors or other devices the information necessary for calculating the target jerk, or may acquire the target jerk calculated by other devices.

Figure 3:
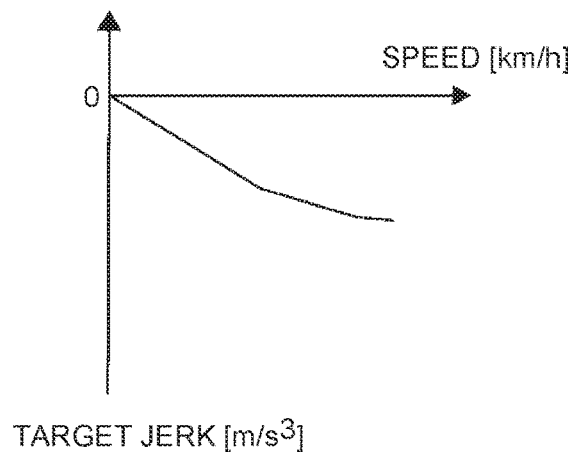
FIG. 3 shows an example of a map of target jerk according to the embodiment of the present disclosure.
Figure 4:
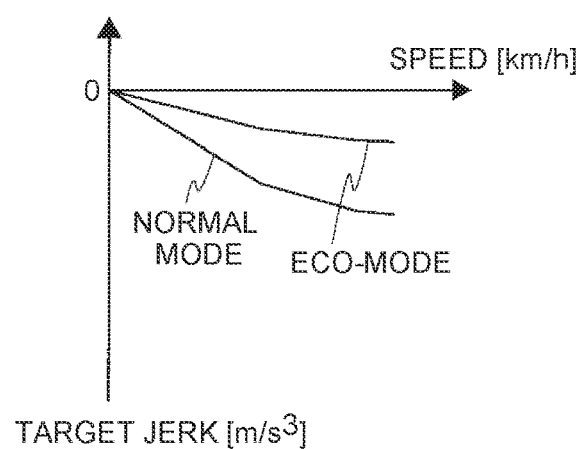
FIG. 4 shows an example of the map of the target jerk according to the embodiment of the present disclosure.
Figure 5:
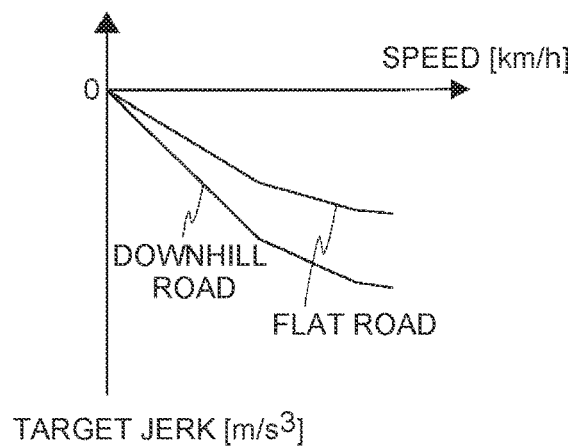
FIG. 5 shows an example of the map of the target jerk according to the embodiment of the present disclosure.

Examples of the calculation method of the target jerk will be described. In each of the examples, a map is used in which target acceleration is predetermined for each speed of the vehicle. FIGS. 3, 4, and 5 schematically show the maps in the respective examples.

In an example shown in FIG. 3, the target jerk becomes smaller, as the speed of the vehicle becomes larger. Specific values can be determined based on evaluation performed by an experiment or the like.

In an example shown in FIG. 4, consideration is given to drive modes representing traveling characteristics specified by the user, as well as to the speed of the vehicle. When the drive mode is an eco-mode which specifies a travel with low fuel consumption, the target jerk is set to be larger than the target jerk at the same speed in a normal mode, which is a drive mode other than the eco-mode. For example, the map shown in FIG. 3 may be used in the normal mode. The map in the eco-mode shown in FIG. 4 may be prepared by multiplying the value of the target jerk according to the map shown in FIG. 3 by a positive coefficient α that is smaller than one. Similarly, when the drive mode is a sport mode which specifies a sporty travel, the target jerk may be set to be smaller than that in the normal mode at the same speed.

In an example shown in FIG. 5, consideration is given to a road surface gradient, in addition to the speed of the vehicle. When the road surface is a downhill road, the target jerk is set to be smaller than that in the case of a flat road at the same speed. For example, the map shown in FIG. 3 may be used in the case of the flat road, and the map in the downhill road shown in FIG. 5 may be prepared by multiplying the value of the target jerk according to the map shown in FIG. 3 by a coefficient β that is larger than one.

When the road surface is an uphill road, the target jerk is set to be larger than that in the case of the flat road at the same speed. For example, the map shown in FIG. 3 may be used in the case of the flat road, and the map in the uphill road may be prepared by multiplying the value of the target jerk according to the map in FIG. 3 by a coefficient γ that is smaller than one.

The target jerk may also be calculated based on both the drive mode and the road surface gradient. For example, the map shown in FIG. 3 may be used in the case of the flat road and the normal mode, and a map in the uphill road and the eco-mode may be prepared by multiplying the value of the target jerk according to the map shown in FIG. 3 by the coefficient α and the coefficient β. Similarly, a map in the uphill road and the eco-mode may be prepared by multiplying the value of the target jerk according to the map shown in FIG. 3 by the coefficient α and the coefficient γ.

For calculation of the target jerk, various kinds of information output from various sensors and an electronic control unit (ECU) included in the vehicle is used. In the above examples, the calculation method of the target jerk, using the speed of the vehicle and further using information indicating the drive mode specified by the user or the gradient of the road surface, is not particularly limited. A basic map may be prepared as described above, and the target jerk may be calculated by multiplying the target jerk by different coefficients in accordance with the state of the vehicle or the periphery thereof, or by using maps individually prepared for respective states in advance. Alternatively, when the presence of another vehicle is detected a prescribed distance ahead of the vehicle by, for example, a camera and a radar, the information indicating the presence may be acquired to set the target jerk smaller than the case without the presence of another vehicle at the same speed.

(Step S103): the control unit 104 determines whether or not to cause the second actuator unit 300 to generate jerk. First, the control unit 104 acquires from the first actuator unit 200 a negative jerk j1 that the first actuator unit 200 can currently generate. When the first actuator unit 200 includes, for example, an engine and a transmission, the control unit of the first actuator unit 200 can calculate the jerk j1 based on an engine throttle opening (zero in the coasting state), and a current gear stage of the transmission, for example. The jerk j1 is the jerk assumed when the operating state of the first actuator unit 200, such as the gear stage, is maintained unchanged from the current state.

Next, the control unit 104 compares the jerk j1 with the target jerk J calculated in step S102 to determine whether or not to cause the second actuator unit 300 to generate negative jerk. When the jerk j1 is equal to or less than the target jerk J, the first actuator unit 200 generates sufficient negative jerk. Accordingly, the control unit 104 determines to prevent the second actuator unit 300 from generating the negative jerk. Then, the process proceeds to step S101, where the control unit 104 waits until the coasting state is restarted.

When the jerk j1 is larger than the target jerk J, the negative jerk to be generated by the first actuator unit 200 is short of the target jerk. Accordingly, the control unit 104 determines to cause the second actuator unit 300 to generate negative jerk. The process proceeds to step S104.

(Step S104): the control unit 104 determines whether or not a prescribed factor, which increases the braking force generated by the first actuator unit 200, currently occurs. For example, when the first actuator unit 200 includes a transmission, examples of the prescribed factor may include gear shifting by the control from other control systems, and reduction in output torque caused by engagement of a lock-up clutch included in the transmission. For example, the control unit 104 can acquire information indicating whether or not such a prescribed factor currently occurs from the control unit of the first actuator unit 200, and can use the information for determination. When the control unit 104 determines that the prescribed factor occurs, the process proceeds to step S105. When the control unit 104 determines that the prescribed factor does not occur, the process proceeds to step S110.

(Step S105): the control unit 104 estimates an increment D of the braking force generated by the first actuator unit 200. Examples of an estimation method will be described below.

Figure 6:
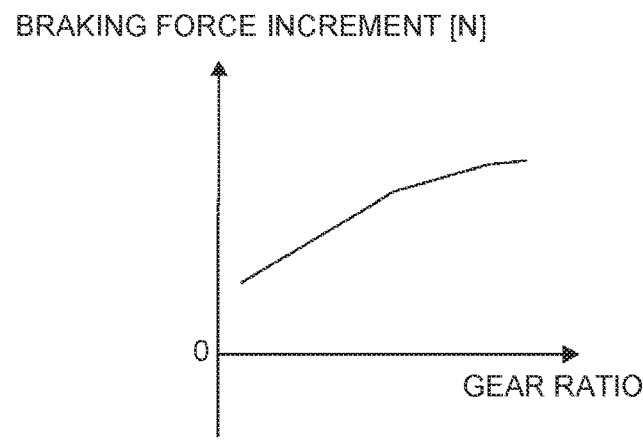
FIG. 6 shows an example of the characteristics of an increment of braking force according to the embodiment of the present disclosure.
Figure 7:
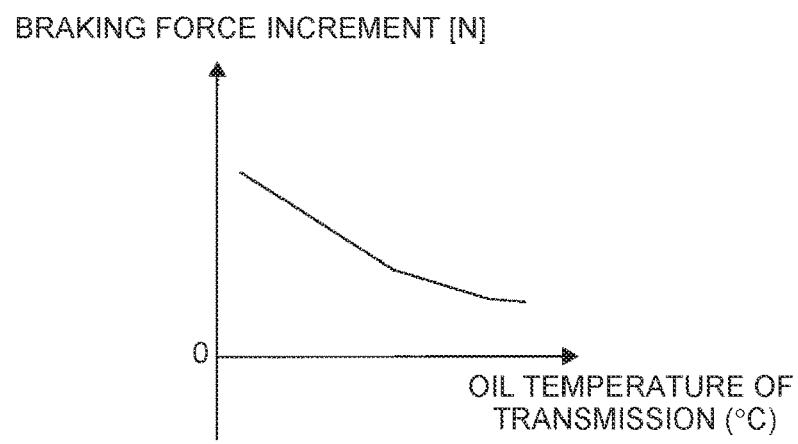
FIG. 7 shows another an example of the characteristics of the increment of braking force according to the embodiment of the present disclosure.

When the first actuator unit 200 includes a transmission, and the prescribed factor includes gear shifting of the transmission, the increment D of the braking force can be calculated, for example, based on a gear ratio or oil temperature of the transmission. FIG. 6 schematically shows a map indicating the relationship between the gear ratio of the transmission and the increment of the braking force. The map indicates that as a current gear ratio is larger, a temporary increment of the braking force in a transient state of the gear shifting is larger. With reference to such a map, the control unit 104 can estimate the increment D corresponding to the gear ratio in a current gear stage. FIG. 7 schematically shows a map indicating the relationship between the oil temperature of the transmission and the increment of the braking force. The map indicates that as a current oil temperature of the transmission is larger, a temporary increment of the braking force in the transient state of the gear shifting is smaller. The control unit 104 can estimate the increment D corresponding to the current oil temperature of the transmission with reference to such a map.

Figure 8:
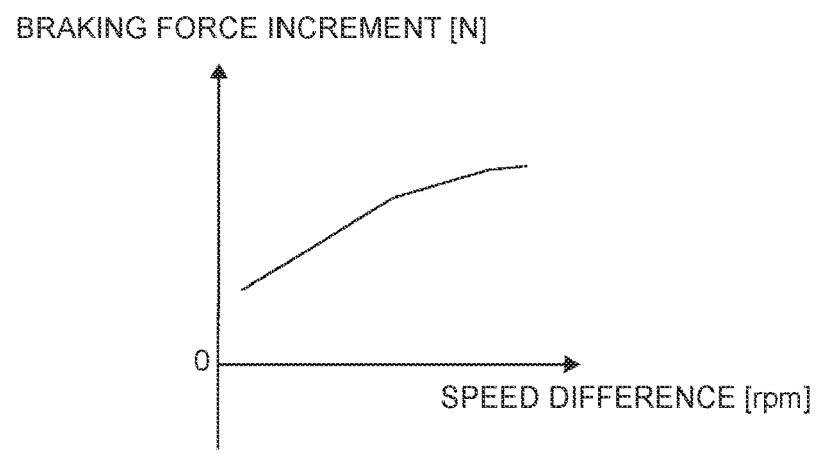
FIG. 8 shows an example of the characteristics of the increment of braking force according to the embodiment of the present disclosure.
Figure 9:
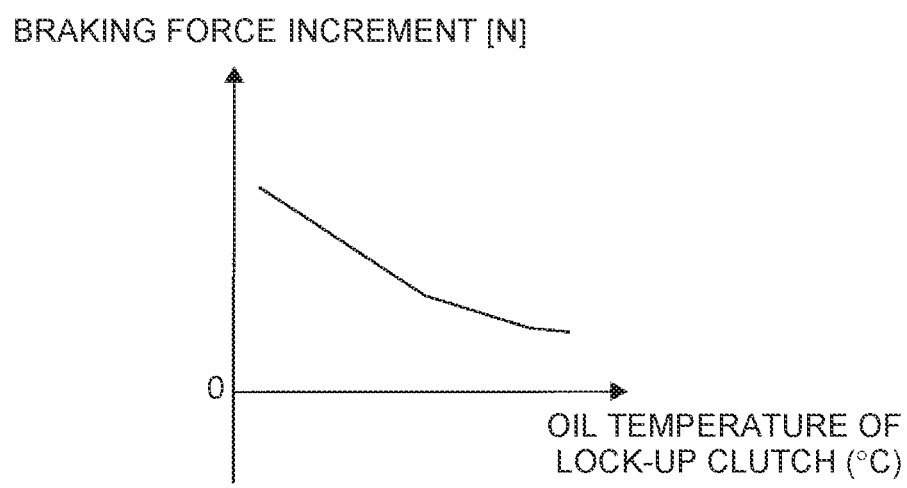
FIG. 9 shows an example of the characteristics of the increment of braking force according to the embodiment of the present disclosure.

When the first actuator unit 200 includes a lock-up clutch, and the prescribed factor includes engagement of the lock-up clutch, the increment D of the braking force can be calculated based on a difference between the speed of the engine and the speed of the transmission on the lock-up clutch side, and on the oil temperature of the lock-up clutch, for example. FIG. 8 schematically shows a map indicating the relationship between the speed of the transmission and the increment of the braking force. The lock-up clutch is typically included in the transmission. The lock-up clutch is disengaged at the start of the gear shifting. Then, the speed of the transmission on the lock-up clutch side increases due to gear shifting, so that the speed of the engine side becomes smaller than the speed of the transmission on the lock-up clutch side. When the speed of the engine side increases up to a prescribed allowable range from this state, the lock-up clutch is engaged again. The map indicates that as a difference in speed at the time of engagement is larger, a temporary increment of the braking force at the time of engagement is larger. The control unit 104 can estimate the increment D corresponding to the estimated difference in speed at the time of engagement with reference to such a map. FIG. 9 schematically shows a map indicating the relationship between the oil temperature of the lock-up clutch and the increment of the braking force. The map indicates that as the current oil temperature of the lock-up clutch is higher, a temporary increment of the braking force at the time of engagement is smaller. The control unit 104 can estimate the increment D corresponding to the current oil temperature of the lock-up clutch with reference to such a map.

To estimate the increment D, the control unit 104 can properly acquire information, including current gear stage, speed, and each oil temperature of the transmission, from the control unit of the first actuator unit 200. As the above-stated maps, those prepared by experiments or the like in advance can be used. The control unit 104 can combine the above estimation methods. More specifically, the control unit 104 can estimate the increment D based on a map which defines an increment corresponding to two or more combinations, out of the gear stage, the speed, and each oil temperature. The estimation methods of the increment D are not limited to these. Appropriate estimation methods may be adopted in accordance with types and characteristics of the actuators of the first actuator unit 200.

(Step S106): the control unit 104 compares the increment D of the braking force estimated in step S105 with prescribed thresholds d1(>0), d2(>d1). When the increment D is equal to or less than the threshold d1, the process proceeds to step S107. When the increment D is larger than the threshold d1, and is equal to or less than the threshold d2, the process proceeds to step S108. When the increment D is larger than the threshold d2, the process proceeds to step S109.

(Step S107): the control unit 104 determines negative jerk to be generated by the second actuator unit 300. In this step, for example, a jerk j2 to be generated by the second actuator unit may be set to a difference (J−j1) between the target jerk J calculated in step S102 and the jerk j1 that can currently be generated by the first actuator unit 200, the jerk j1 being acquired in step S103. The control unit 104 instructs the second actuator unit 300 to generate the jerk j2 (=J−j1). The control unit 104 may calculate the value of drive force which gradually decreases based on the jerk j2, and may sequentially indicate the value to the second actuator unit 300. The control unit of the second actuator unit 300 may cause the actuator to generate the indicated drive force. Alternatively, the control unit 104 may indicates the jerk j2 to the second actuator unit 300. The control unit of the second actuator unit 300 may calculate the drive force which gradually decreases based on the indicated jerk j2, and may cause the actuator to generate the indicated jerk j2. In this step, when increase in the braking force due to the prescribed factor does not occur in the first actuator unit 200, a sum of the negative jerk j1 generated by the first actuator unit 200 and the negative jerk j2 generated by the second actuator unit 300 becomes equal to the target jerk J. This step is executed when increase in the braking force generated by the first actuator unit 200 does not occur or when the level of the increase is relatively small even if the increase occurs. Accordingly, the negative jerk and negative acceleration generated in the vehicle fall within an adequate range. Then, the process proceeds to step S101, where the control unit 104 waits until the coasting state is restarted (Step S108): the control unit 104 determines negative jerk to be generated by the second actuator unit 300. In this step, the jerk j2 to be generated by the second actuator unit may be obtained by multiplying a value calculated as in step S107 by a positive coefficient δ that is smaller than one, for example. The control unit 104 instructs the second actuator unit 300 to generate the jerk j2 (=α×(J−j1). Thus, in the present step, the negative jerk j2 generated by the second actuator unit 300 is corrected such that an absolute value of the negative jerk j2 becomes smaller (lower) than the negative jerk j2 obtained in step S107. The present step is executed when the degree of increase in the braking force generated by the first actuator unit 200 is relatively medium. When the correction is performed, the negative acceleration or the negative jerk generated in the vehicle is less likely to become smaller than an adequate range, and deterioration in the ride comfort or the operation feeling can be restrained. Then, the process proceeds to step S101, where the control unit 104 waits until the coasting state is restarted.

(Step S109): the control unit 104 prevents the second actuator unit 300 from generating negative jerk regardless of the determination of step S103. The present step is executed when the degree of increase in the braking force generated by the first actuator unit 200 is relatively large. Since the second actuator unit 300 is prevented from generating the negative jerk, the negative acceleration or the negative jerk generated in the vehicle is less likely to become smaller than the adequate range, and deterioration in the ride comfort or the operation feeling can be restrained. Then, the process proceeds to step S101, where the control unit 104 waits until the coasting state is restarted.

(Step S110): the control unit 104 determines whether or not the prescribed factor occurs within a prescribed period from present time. Examples of the determination method will be described below.

Figure 10:
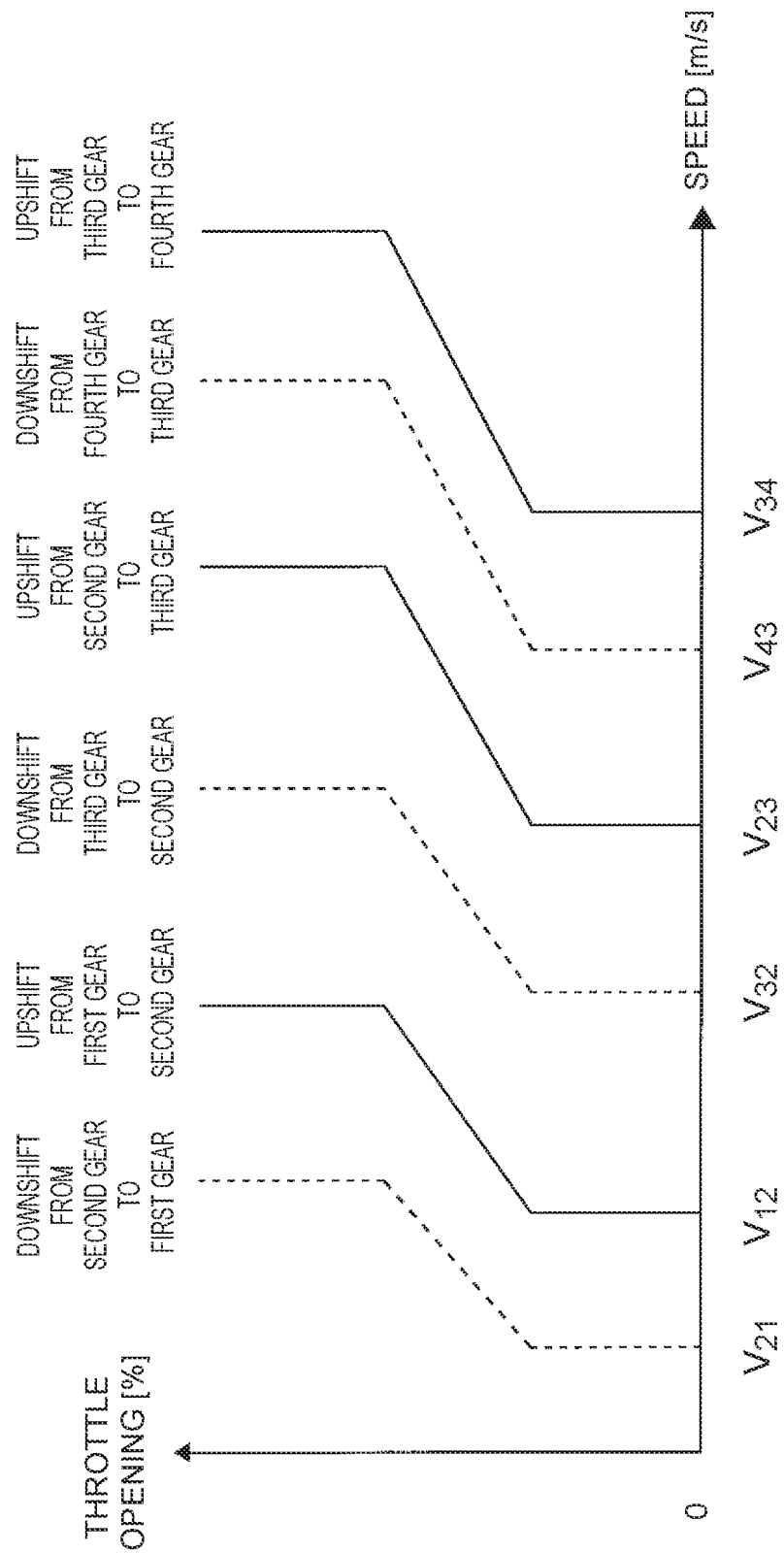
FIG. 10 shows an example of control characteristics of a transmission according to the embodiment of the present disclosure.

Description is given of the method of determining whether or not gear shifting of the transmission, that is the prescribed factor, occurs within a prescribed period, in the case where the first actuator unit 200 includes the transmission. The control unit 104 can refer to a map indicating the characteristics of transmission control of the transmission performed by another control system. FIG. 10 shows an example of the map. In the map shown in FIG. 10, the gear stage of the transmission is determined based on vehicle speed and throttle opening. In acceleration of the vehicle, when the speed of the vehicle increases to the speed corresponding to a current throttle opening in a speed shift line shown by a solid line in the map, upshifting starts. In deceleration of the vehicle, when the speed of the vehicle decreases to the speed corresponding to a current throttle opening in a speed shift line shown by a dotted line in the map, downshifting starts. Since the vehicle is in a coasting state, the throttle opening is zero. Hence, the vehicle speed is maintained or decreases in principle. The control unit 104 acquires a current gear stage of the transmission, and identifies the speed at which downshifting from the gear stage starts with the throttle opening of zero. As a result, the control unit 104 can identify the speed at which next gear shifting operation starts in the transmission. In the example shown in FIG. 10, when the current gear stage is third gear, the control unit 104 identifies a speed $V_{32}$ corresponding to the throttle opening of zero in a speed shift line of downshifting from third gear to second gear as the speed at which the next gear shifting operation starts in the transmission.

The control unit 104 identifies a current vehicle speed v and an acceleration a. The speed v can be identified by properly acquiring the speed from a speed sensor included in the vehicle or other devices. The acceleration a can be identified by, for example, acquiring the vehicle speed v at a plurality of time points, and calculating a time variation rate thereof. Alternatively, the control unit 104 may acquire the acceleration a from another device, such as an acceleration sensor included in the vehicle. The control unit 104 may identify the speed at which next gear shifting operation starts in the transmission based on the current gear stage as described above. Alternatively, after the speed v is identified, the speed at which next gear shifting operation starts in the transmission may be identified based on the speed v and the aforementioned map.

The control unit 104 predicts time t1 until next gear shifting operation starts in the transmission from present time. Assuming that the acceleration a of the vehicle is constant, the control unit 104 predicts time t1 until next gear shifting operation starts in the transmission from present time, based on the current speed v, speed V at which next gear shifting operation starts in the transmission, and the acceleration a, according to an expression (1) below:

$$t1 = (v-V)/|a| \qquad \text{Expression (1)}$$

When the predicted time t1 is equal to or less than a prescribed period, the control unit 104 can determine that the prescribed factor occurs within a prescribed period from present time. When the predicted time t1 is larger than the prescribed period, the control unit 104 can determine that the prescribed factor does not occur within a prescribed period from present time.

The method of determining whether or not engagement of a lock-up clutch occurs within a prescribed period as the prescribed factor, in the case where the first actuator unit 200 includes the lock-up clutch, is similar to the method disclosed before. Since the engagement of the lock-up clutch typically occurs with gear shifting of the transmission, time t2 until next engagement of the lock-up clutch occurs can be calculated as in the case of time t1. However, the engagement of the lock-up clutch strictly occurs at the timing when the difference between the speed of the engine and the speed of the transmission on the lock-up clutch side falls within an allowable range after gear shifting of the transmission. Accordingly, time t2 may be a value obtained by adding a prescribed value to time t1, or may be calculated using a map indicating engagement characteristics of the lock-up clutch instead of the map shown in FIG. 10. When the predicted time t2 is equal to or less than a prescribed period, the control unit 104 can determine that the prescribed factor occurs within a prescribed period from present time. When the predicted time t2 is larger than the prescribed period, the control unit 104 can determine that the prescribed factor does not occur within a prescribed period from present time.

When the control unit 104 determines that the prescribed factor occurs within a prescribed period from present time by the aforementioned method, the process proceed to step S111. When the control unit 104 determines that the prescribed factor does not occur within the prescribed period, the process proceeds to step S107. The prescribed period may preferably be set to a period similar to the period during which the coasting state is assumed to continue. The prescribed period may be predetermined, or may be changed in accordance with driving characteristics of the user.

(Step S111): the control unit 104 estimates an increment D' of the braking force generated by the first actuator unit 200. As the estimation method, a method similar to those described in step S105 may be used.

(Step S112): the control unit 104 compares the increment D' of the braking force estimated in step S111 with prescribed thresholds d1'(>0), d2'(>d1'). When the increment D' is equal to or less than the threshold d1', the process proceeds to step S107. When the increment D' is larger than the threshold d1', and is equal to or less than the threshold d2', the process proceeds to step S108. When the increment D' is larger than the threshold d2', the process proceeds to step S109. The thresholds d1', d2' may be similar to or different from the thresholds d1, d2, respectively. For example, the thresholds d1', d2' may be set such that d1'>d1, d2'>d2. The second estimation unit 103 determines whether or not the prescribed factor occurs within a prescribed period from present time based on prediction. Accordingly, the determination is lower in accuracy than the determination regarding whether or not the prescribed factor currently occurs by the first estimation unit 102. Setting d1'>d1, d2'>d2 can reduce insufficient deceleration feeling when prediction of the second estimation unit 103 does not come true, and can restrain deterioration in the ride comfort or operation feeling.

When the accelerator pedal sensor and the brake pedal sensor detect operation of the accelerator pedal or operation of the brake pedal by the user during execution of the process of respective steps S102 to S112, the control unit 104 interrupts the process, and the process proceeds to step S101. Other control systems perform, aside from the present process, conventional general acceleration or deceleration control corresponding to the detected operation of the accelerator pedal or the brake pedal.

The period when the second actuator unit 300 generates the negative jerk j2 ends when the coasting state of the vehicle ends. In addition, the period may end when, for example, the vehicle speed decreases to a prescribed positive speed or zero in the case where the coasting state is relatively long. The prescribed positive speed can be set by a method using a map based on the vehicle speed or the like, like the above-described method used for calculating the target jerk, for example. Alternatively, the period of maintaining generation of the negative jerk may be a predetermined prescribed period, or may variably be set using a method similar to the above-described method for calculating the target jerk.

Figure 11:
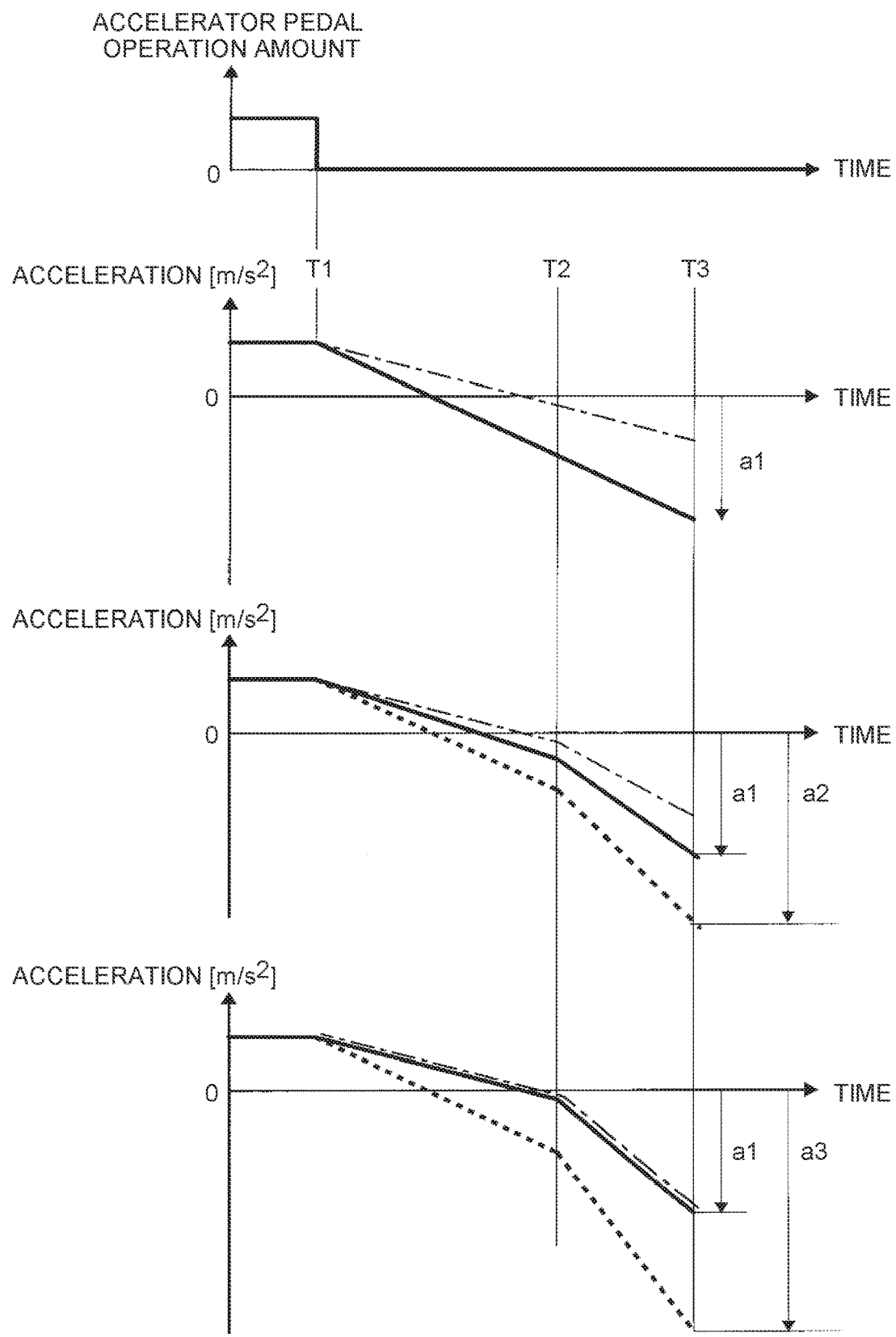
FIG. 11 shows an example of control according to the embodiment of the present disclosure.

Examples of the control based on the above process will be described. FIG. 11 shows graphs where horizontal axis represents time, a vertical axis represents an operation amount of the accelerator pedal, and a thick solid line represents acceleration of the vehicle. Among the graphs indicating the relationship between acceleration and time in FIG. 11, the uppermost graph indicates the case where step S107 is executed without occurrence of increase in the braking force of the first actuator unit 200 due to the prescribed factor. The second uppermost graph indicates the case where step S108 is executed with occurrence of the increase in the braking force of the first actuator unit 200 due to the prescribed factor. The third uppermost graph indicates the case where step S109 is executed with occurrence of the increase in the braking force of the first actuator unit 200 due to the prescribed factor.

In the graphs of FIG. 11, dashed dotted lines further indicate acceleration corresponding to the braking force generated by the first actuator unit 200. For comparison, thick dotted lines indicate the acceleration at the time of executing step S107 although increase in the braking force of the first actuator unit 200 occurs due to the prescribed factor.

Until time T1, the user operates the accelerator pedal, so that conventional control corresponding to the operation amount of the accelerator pedal is executed, and thereby positive acceleration is generated.

In time T1, when the user stops accelerator pedal operation, the vehicle shifts to a coasting state where both the accelerator pedal operation and the brake pedal operation are not performed. After time T1, the braking force is generated by the first actuator unit 200 in all of the three graphs indicating the relationship between acceleration and time in FIG. 11. In the case of the uppermost graph and the second uppermost graph among the graphs indicating the relationship between acceleration and time in FIG. 11, braking force is further generated by the second actuator unit 300. With the braking force, acceleration of the vehicle gradually decreases.

In the case of the second uppermost graph and the third uppermost graph among the graphs indicating the relationship between acceleration and time in FIG. 11, increase in the braking force due to the prescribed factor occurs in time T2, and therefore the braking force generated by the first actuator unit 200 increases. The second uppermost graph and the third uppermost graph indicate both the case where the prescribed factor occurs in time T1, and increase in braking force actually occurs in time T2, and the case where occurrence of the prescribed factor is predicted in time T1, and the prescribed factor actually occurs in time T2, or increase in the braking force occurs practically at the same time with the prediction. In the case of the third uppermost graph among the graphs indicating the relationship between acceleration and time in FIG. 11, the magnitude of the negative jerk (inclination) generated by the second actuator unit 300 is reduced lower than that in the case of the second uppermost graph among the graphs indicating the relationship between acceleration and time. In the case of the third uppermost graph among the graphs indicating the relationship between acceleration and time, the second actuator unit 300 does not generate the jerk. Accordingly, in the example shown in FIG. 11, in three graphs indicating the relationship between acceleration and time, the acceleration of the vehicle is an identical negative acceleration a1 in time T3. This indicates that regardless of the presence or the degree of change in braking force by the first actuator unit 200, the time required until reaching the same acceleration is the same. As a result, a similar deceleration feeling can be presented to the user.

On the other hand, when there is a change in the braking force by the first actuator unit 200, and the jerk to be generated by the second actuator is not restrained, the time required until reaching the same acceleration becomes shorter, or the negative acceleration a2, a3 in time T3 becomes smaller than the acceleration a1 as shown by the thick dotted lines in the second uppermost and third uppermost graphs among the graphs indicating the relationship between acceleration and time in FIG. 11. As a result, the deceleration feeling presented to the user becomes too large.

Effects

In the present disclosure, jerk is controlled to achieve deceleration feeling assumed to be expected by the user in the coasting state of the vehicle, and thereby achieves adequate ride comfort and operation feeling of a vehicle. When braking force increases due to gear shifting of the transmission or the like in particular, the jerk generated by the brake or the like is reduced in order to reduce fluctuation in deceleration feeling and to restrain the ride comfort and the operation feeling from deteriorating.

Although one embodiment of the present disclosure has been described in the foregoing, the present disclosure can be regarded as a control method of braking force executed by one or more computers included in a braking force controller, a braking force control program, a computer-readable non-transitory recording medium storing the braking force control program, and a vehicle or the like mounted with a braking force control system, in addition to the braking force controller.

The present disclosure is useful for the braking force controller mounted on a vehicle or the like.

What is claimed is:

1. A braking force controller mounted on a vehicle including a first actuator unit and a second actuator unit, which includes a brake, configured to generate braking force, the braking force controller being configured to control the braking force to be generated by the second actuator unit, when an operation amount of an accelerator pedal shifts to zero from other than zero, and the vehicle is put in a coasting state due to an operation amount of a brake pedal being zero, the braking force controller comprising a processor programmed to:

calculate a target jerk that is a generation target value of jerk when the braking force is generated in the vehicle, the jerk being negative when a vehicle travel direction is defined as a positive direction;

determine whether or not a prescribed factor that increases the braking force generated by the first actuator unit currently occurs, and estimate, when determining that the prescribed factor occurs, a first increment of the braking force due to the prescribed factor;

determine whether or not the prescribed factor occurs within a prescribed period of time from present time even when the prescribed factor does not currently occur in the vehicle, and estimate, when determining that the prescribed factor occurs, a second increment of the braking force due to the prescribed factor;

determine, based on the calculated target jerk, that a sum of (i) the negative jerk generated when the second actuator unit generates the braking force, and (ii) the jerk generated by the first actuator unit when the prescribed factor does not increase the braking force, becomes the target jerk; and when the prescribed factor currently occurs or occurs within the prescribed period, and the increment of the braking force due to the prescribed factor is larger than a prescribed value, correct the determined negative jerk such that an absolute value of the negative jerk becomes smaller based on the estimated first increment of braking force or the estimated second increment of braking force.

2. The braking force controller according to claim 1, wherein:

the first actuator unit includes a transmission;

the prescribed factor includes gear shifting by the transmission; and the processor is programmed to estimate the first increment and the second increment of the braking force due to the gear shifting by the transmission, based on at least one of a current gear ratio of the transmission, and oil temperature of the transmission.

3. The braking force controller according to claim 2, wherein the processor determines whether or not gear shifting of the transmission occurs within a prescribed period from present time, based on current speed, current acceleration, and current gear shifting speed of the vehicle.

4. The braking force controller according to claim 1, wherein:

the first actuator unit includes a lock-up clutch;

the prescribed factor includes engagement of the lock-up clutch; and the processor is programmed to estimate the first increment and the second increment of the braking force due to the engagement of the lock-up clutch, based on at least one of a difference between speed of an engine and speed of a transmission on a side of the lock-up clutch, and oil temperature of the lock-up clutch.

5. The braking force controller according to claim 4, wherein the processor determines whether or not the engagement of the lock-up clutch occurs within a prescribed period from present time, based on current speed, current acceleration, and current gear shifting speed of the vehicle.

* * * * *